US007753181B2

(12) United States Patent
Doornbos

(10) Patent No.: US 7,753,181 B2
(45) Date of Patent: Jul. 13, 2010

(54) DAMPER HAVING SILICONE IMPREGNATED AND SILICONE CONTAINING COMPONENTS

(75) Inventor: David A. Doornbos, Manteno, IL (US)

(73) Assignee: Illinois Tool Works Inc., Glenview, IL (US)

( * ) Notice: Subject to any disclaimer, the term of this patent is extended or adjusted under 35 U.S.C. 154(b) by 1217 days.

(21) Appl. No.: 11/047,308

(22) Filed: Jan. 31, 2005

(65) Prior Publication Data
US 2006/0169555 A1 Aug. 3, 2006

(51) Int. Cl.
*F16D 57/00* (2006.01)
(52) U.S. Cl. .................................... 188/290
(58) Field of Classification Search ......... 188/290–310, 188/322.5; 464/57, 40; 74/574, 573 F, 575; 16/51, 82, 50, 54
See application file for complete search history.

(56) References Cited
U.S. PATENT DOCUMENTS

| | | | | | |
|---|---|---|---|---|---|
| 4,432,254 | A | * | 2/1984 | Schultz | 74/574 |
| 4,869,125 | A | * | 9/1989 | Saigusa | 74/574 |
| 5,497,863 | A | * | 3/1996 | Schmidt et al. | 188/306 |
| 5,865,278 | A | * | 2/1999 | Wagner | 188/130 |
| 6,298,960 | B1 | * | 10/2001 | Derr | 188/290 |
| 6,341,677 | B1 | * | 1/2002 | Oliver et al. | 188/307 |
| 6,513,811 | B1 | | 2/2003 | Bivens | |
| 6,604,614 | B2 | * | 8/2003 | Kurihara et al. | 188/290 |
| 6,662,683 | B1 | * | 12/2003 | Takahashi et al. | 464/180 |
| 6,726,219 | B2 | * | 4/2004 | Bivens | 277/549 |
| 6,840,356 | B2 | * | 1/2005 | Nishiyama | 188/306 |
| 6,866,588 | B2 | * | 3/2005 | Doornbos | 464/40 |
| 2001/0017247 | A1 | * | 8/2001 | Machida | 188/290 |
| 2002/0167133 | A1 | | 11/2002 | Bivens | |
| 2004/0226789 | A1 | * | 11/2004 | Doornbos et al. | 188/290 |
| 2005/0045439 | A1 | | 3/2005 | Nishiyama | |

FOREIGN PATENT DOCUMENTS

| | | |
|---|---|---|
| CN | 1267257 | 9/2000 |
| DE | 39 21 326 A1 | 1/1990 |
| DE | 19963580 | 8/2001 |
| EP | 0540298 | 5/1993 |
| EP | 1 081 419 A | 3/2001 |
| EP | 1227263 | 7/2002 |
| EP | 1 489 333 A | 12/2004 |
| GB | 2246186 * | 1/1992 |
| JP | 01 320 340 | 12/1986 |

* cited by examiner

*Primary Examiner*—Christopher P Schwartz
(74) *Attorney, Agent, or Firm*—Mark W. Croll; Paul F. Donovan

(57) ABSTRACT

A damper for damping movement of an object is formed from silicone impregnated or silicone containing components. The damper includes a housing having walls defining a well and a rotor positioned in the housing within the well. The rotor is positioned to define a space between the rotor and the walls. One or more seals is positioned between the housing and the rotor to isolate the space from the environment. A damping fluid is present in the well between the rotor and the housing for damping rotation of the rotor relative to the housing. The housing, the rotor and the seals are formed from silicone containing or silicone impregnated materials. The damping fluid is also a silicone based material.

15 Claims, 1 Drawing Sheet

DAMPER HAVING SILICONE IMPREGNATED AND SILICONE CONTAINING COMPONENTS

BACKGROUND OF THE INVENTION

The present invention pertains to dampers. More particularly, the present invention pertains to a damper formed from various silicone impregnated and silicone containing components.

Dampers are used in various assemblies to control the movement of an object. For example, damper devices are used in automobiles to dampen the movement of grab handles, gloves box doors and the like.

A typical damper includes a housing or body, a rotor positioned in the housing, a damping fluid between the rotor and housing and a seal positioned between the housing and the body to maintain the fluid in the space between the housing and the rotor and to prevent contamination of the fluid.

One current damper design uses a housing formed from DELRIN® acetal, a rotor formed from VYDYNE® nylon resin a silicone seal (having a durometer of 70) and a damping fluid. While this damper functions well generally, there can be a fairly high amount of friction generated between the housing, seal and rotor. This can be even more problematic in that the friction can result in varying torque responses and as such, inconsistent damper function.

Accordingly, there is a need for a damper in which the amount of friction between the damper components is reduced. Desirably, such damper is configured to readily replace (e.g., fit in place of) known dampers. More desirably, such a damper is assembled from readily commercially available materials in a cost effective manner. Most desirably, such a damper exhibits consistent damping characteristics.

BRIEF SUMMARY OF THE INVENTION

A damper for damping movement of an object is formed from silicone impregnated or silicone containing components. The damper includes a housing having inner and outer walls that define a well and a rotor positioned in the well. A fluid space is defined between the rotor and the walls.

Seals are positioned between the housing and the rotor to isolate the fluid space from the environment. A damping fluid is present in the well between the rotor and the housing for damping rotation of the rotor relative to the housing. Each of the components is formed from a silicone containing or silicone impregnated material. Preferably, the damping fluid is a silicone based fluid.

The present damper shows significantly reduced friction between the damper components in the form of reduced torque required to rotate the rotor. The damper is configured to readily replace known dampers and is assembled from readily commercially available materials.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
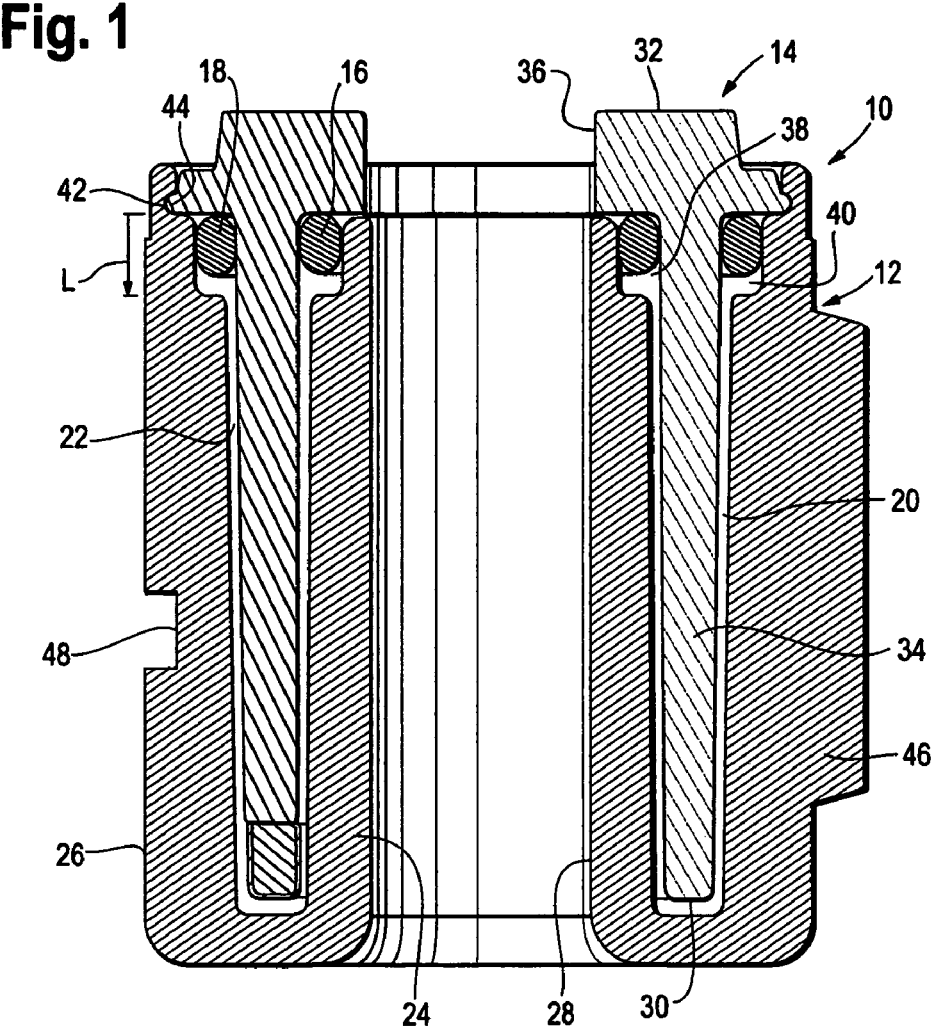
FIG. 1 is a cross-sectional illustration of one embodiment of a silicone impregnated component damper in accordance with the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States patent Office, and does not imply, nor should be inferred to limit the subject matter disclosed herein.

Referring now to the figures and in particular, to FIG. 1, there is shown a silicone impregnated component damper 10 embodying the principles of the present invention. The damper 10 includes a housing 12, a rotor 14 and a pair of seals 16, 18 disposed between the rotor 14 and the housing 12. A gap 20 is defined between the rotor 14 and the housing 12 and a damping fluid 22 is disposed in the gap 20. The seals 16, 18 prevent leakage of the fluid 22 out of the damper 10 and also prevent contaminants from entering the fluid 22.

In a present damper, the housing 12 is formed as a concentric walled cylindrical element having an inner wall 24 and an outer wall 26 and defining a central, longitudinal sleeve 28. A well 30 is defined between the inner and outer walls 24, 26. The rotor 14 is formed as a cylindrical element having a flange or cap 32 and a wall 34 depending from the flange 32. The flange 32 has a central opening 36 that is concentric with the housing sleeve 28. In this manner, when the rotor 14 is positioned in the housing 12, with the depending wall 34 in the well 30, the flange opening 36 aligns with the housing longitudinal sleeve 28.

The damping fluid 22 is disposed in (filled into) the well 30 space between the inner and outer housing walls 24, 26, and around the rotor depending wall 34. As such the rotor 14 rotates within the housing 12, in the damping fluid 22.

The housing 12 has a pair of seal channels 38, 40, one formed in each the inner and outer walls 24, 26 to receive the seals 16, 18. Typically seals are formed as O-rings or the like. In a present embodiment, the seal channels 38, 40 are elongated in the longitudinal direction, as indicated at L, to, as discussed below, accommodate expansion of the seals 16, 18 and/or fluid 22 when the damper is in use, without compromising the seals 16, 18 or the integrity of the damper 10. The housing 12 also includes a retaining recess 42 outwardly of the channels 38, 40 to receive a bead 44 formed on the flange 32 to lock or "snap-fit" the rotor flange 32 to the housing 12.

To accommodate proper fit and securing of the damper 10 into an object (e.g., glove box door) movement assembly, the housing 12 can include tabs or wings 46 and/or recesses 48 to mate or engage portions of the object assembly.

As will be appreciated by those skilled in the art, the purpose of a damper 10 of the present type is to absorb energy from movement of the object to better control (generally slow) the movement of the object. This energy is absorbed in the form of friction as well as the fluid's resistance to movement. Both of these result in the generation of heat.

Unlike known dampers, the present damper 10 uses a novel combination of silicone containing and silicone impregnated components to minimize friction and thus reduce heat generated by the damper assembly 10. As set forth above, known dampers that use a DELRIN® housing, VYDYNE® rotor and (70 durometer) silicone seals have been shown to function inconsistently because of varying torque responses. This is believed to be due to the heat build-up and resulting temperature increase of the materials. This also results in the expansion and contraction of the various damper materials which, it is believed, further adds to the functional inconsistencies of these known dampers.

The present damper 10 uses a housing 12 formed from a copolymer in a general class of polyoxymethylenes, and more specifically, a medium viscosity, low wear acetal copolymer having silicone impregnated in the copolymer. A present housing 12 material is a low wear acetal having 2 percent silicone, such as CELCON® LW90 S2, commercially available from Ticona Engineering Polymers of Florence, Ky. The rotor 14 is formed from a silicone impregnated nylon, such as VYDYNE®, commercially available from Solutia, Inc. of Pensacola, Fla., with a Siloxane additive, such as that available from Dow Corning of Midland, Mich., as part/product No. MB-50-011. The seals 16, 18 are also formed from silicone materials having a durometer of about 40. The damping fluid 22 is also a silicone based fluid.

It has been found that the present combination of materials provides a low friction damper 10 having consistent and repeatable characteristics. Comparisons of torque values were made for dampers formed having various material constructions. TABLE 1, below, provides a listing of the various combinations of housing 12 and rotor 14 materials of construction and seal 16, 18 durometers. The torque values shown below are the average torque values measured over a period of 72 hours in units of Newton-centimeters (N-cm), when rotating the damper 10 (rotor 14) at 20 revolutions per minute (20 rpm).

TABLE 1

TORQUE COMPARISON FOR VARIOUS DAMPER

| Material Combination No. | Housing Mat'l | Rotor Mat'l | Seal Dur. | Torque (N-cm) |
|---|---|---|---|---|
| 1 | Si-Acetal | VYDYNE ®/Siloxane | 40 | 4.9 |
| 2 | Si-Acetal | VYDYNE ® | 40 | 5.2 |
| 3 | Si-Acetal | VYDYNE ®/Siloxane | 70 | 5.4 |
| 4 | DELRIN ® | VYDYNE ® | 40 | 5.7 |
| 5 | DELRIN ®/Siloxane | VYDYNE ®/Siloxane | 40 | 5.7 |
| 6 | DELRIN ®/Siloxane | VYDYNE ® | 40 | 5.8 |
| 7 | DELRIN ® | VYDYNE ®/Siloxane | 40 | 5.9 |
| 8 | DELRIN ® | VYDYNE ®/Siloxane | 70 | 6.3 |
| 9 | DELRIN ®/Siloxane | VYDYNE ®/Siloxane | 70 | 6.4 |
| 10 | Si-Acetal | VYDYNE ® | 70 | 6.7 |
| 11 | DELRIN ®/Siloxane | VYDYNE ® | 70 | 6.9 |
| 12 | DELRIN ® | VYDYNE ® | 70 | 8.4 |

Material Constructions

Figure 2:
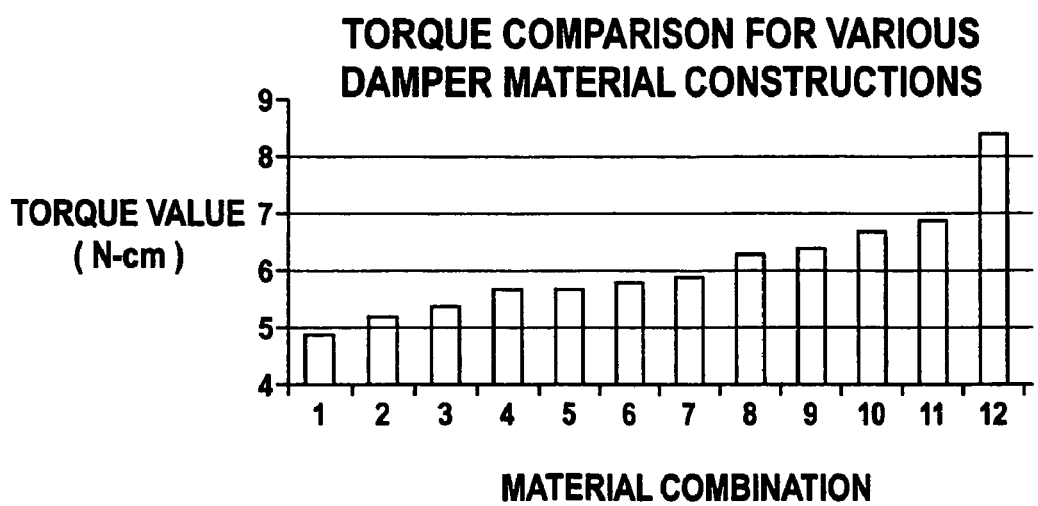
FIG. 2 is a graphical representation of the results of a comparison of the torque values observed for various damper material combinations.

As can be seen from the results provided in TABLE 1, there is a torque reduction of almost 42 percent between the damper having the material construction of combination No. 1 and that of combination No. 12. It should be noted that the present damper 10 materials of construction are those of combination No. 1 and that the materials of combination 12 are those of known dampers and do not contain silicone. A graphic depiction of the results is shown in FIG. 2.

Conventional thought in the industry is that the combination of a silicone impregnated or containing housing 12, rotor 14, seal 16, 18 components and damper fluid 22 would not function well in that swelling of the seals 16, 18 in conjunction with the fluid 22 would result in leakage at the seals 16, 18. It has, been shown that the present damper 10 does in fact function well and that leakage is no more likely than known damper assemblies.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A damper, comprising:
   a housing having walls defining a well;
   a rotor positioned in the housing within the well, the rotor positioned to define a space between the rotor and the walls, the rotor positioned for rotation within the housing;
   a seal chamber defined at least in part by the rotor and the housing contiguous with the space between the rotor and the housing, the seal chamber being elongated in a longitudinal direction;
   at least one seal positioned in the seal chamber, between the housing and the rotor to isolate the space from the environment, the seal having a dimension less than the elongated dimension of the seal chamber, and extending less than the elongated dimension of the seal chamber; and
   a damping fluid in the well between the rotor and the housing for damping rotation of the rotor relative to the housing,
   wherein the housing, the rotor and the at least one seal are formed from a silicone containing or silicone impregnated material and wherein the damping fluid is a silicone based fluid.

2. The damper in accordance with claim 1 wherein the housing is formed from a silicone impregnated acetal copolymer.

3. The damper in accordance with claim 2 wherein the silicone is impregnated at a concentration of about 2 percent of the copolymer.

4. The damper in accordance with claim 1 wherein the rotor is formed from a silicone impregnated nylon.

5. The damper in accordance with claim 1 wherein the housing has an inner wall and an outer wall, the well being formed between the inner and outer walls, wherein the well is defined, in part, by the seal chamber and wherein the damper includes a pair of seals, the seals disposed within the seal chamber, a first seal at a juncture of the inner wall and the rotor and a second seal at a juncture of the outer wall and the rotor.

6. The damper in accordance with claim 5 wherein the seals are formed from a silicone material having a durometer of about 40.

7. The damper in accordance with claim 5 wherein the housing includes a retaining element for receiving a cooperating retaining element on the rotor to secure the rotor to the housing.

8. The damper in accordance with claim 7 wherein the housing retaining element is a recess in the outer wall and the rotor retaining element is a bead formed in a flange of the rotor.

9. A damper for damping movement of an associated object, comprising:
- a first stationary portion formed from a silicone impregnated or silicone containing rigid material;
- a second movable portion formed from a silicone impregnated or silicone containing rigid material, the second portion being movable relative to the first stationary portion, the second portion disposed relative to the first portion to define a space, an interface of the first stationary portion and a the second movable portion defining a seal well, the seal well having a first dimension and a second transverse dimension;
- a damping fluid disposed between the first stationary portion and the second movable portion in the space therebetween, the damping fluid being a silicone containing fluid, wherein free movement of the second portion relative to the first portion is restricted by the presence of the damping fluid; and
- a least one seal disposed in the seal well, the seal extending the entire first dimension and less than the entire second transverse dimension.

10. The damper in accordance with claim 9 wherein the first and second portions are formed from polymeric materials having the silicone added to the materials.

11. The damper in accordance with claim 10 wherein the first portion is formed from a silicone impregnated acetal polymer.

12. The damper in accordance with claim 11 wherein the silicone is present in a concentration of about 2 percent.

13. The damper in accordance with claim 11 wherein the second portion is formed from a silicone impregnated nylon.

14. The damper in accordance with claim 9 wherein the first stationary portion is formed as a housing having walls defining a well and the second movable portion is disposed, at least in part in the well, the damping fluid disposed in the well to dampen movement of the second portion relative to the first portion.

15. The damper in accordance with claim 9 wherein the seal is formed from a silicone impregnated or silicone containing material.

* * * * *